(12) United States Patent
Fan et al.

(10) Patent No.: US 10,551,631 B2
(45) Date of Patent: Feb. 4, 2020

(54) DISPLAY PANEL AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu (CN)

(72) Inventors: Haoyuan Fan, Beijing (CN); Qian Wu, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

(*) Notice: Subject to any disclaimer, the term of this patent is extended or adjusted under 35 U.S.C. 154(b) by 367 days.

(21) Appl. No.: 15/500,823

(22) PCT Filed: Oct. 19, 2015

(86) PCT No.: PCT/CN2015/092164
§ 371 (c)(1),
(2) Date: Jan. 31, 2017

(87) PCT Pub. No.: WO2016/197499
PCT Pub. Date: Dec. 15, 2016

(65) Prior Publication Data
US 2017/0212358 A1    Jul. 27, 2017

(30) Foreign Application Priority Data
Jun. 12, 2015 (CN) .......................... 2015 1 0323942

(51) Int. Cl.
*G02B 27/22* (2018.01)
*G02B 5/18* (2006.01)
*H04N 13/31* (2018.01)

(52) U.S. Cl.
CPC ............. *G02B 27/225* (2013.01); *G02B 5/18* (2013.01); *G02B 27/2214* (2013.01); *H04N 13/31* (2018.05)

(58) Field of Classification Search
CPC ............ G02B 27/2214; G02B 27/2228; G02B 27/2264; G02B 27/0172; G02B 27/26;
(Continued)

(56) References Cited

U.S. PATENT DOCUMENTS

2010/0149074 A1    6/2010 Kwon et al.
2011/0157257 A1*   6/2011 Bennett ..................... G06F 3/14
                                                            345/690
(Continued)

FOREIGN PATENT DOCUMENTS

CN    2690910    4/2005
CN    1912704    2/2007
(Continued)

OTHER PUBLICATIONS

Written Opinion of the International Searching Authority from corresponding PCT Application No. PCT/CN2015/092164, dated Feb. 25, 2016 (5 pages).
(Continued)

*Primary Examiner* — Collin X Beatty
*Assistant Examiner* — Grant A Gagnon
(74) *Attorney, Agent, or Firm* — Dave Law Group LLC; Raj S. Dave

(57) ABSTRACT

Embodiments of the present disclosure provide a display panel and a display device. The display panel of the present disclosure comprises matrix-arranged pixel units and a grating provided at a light-exiting surface side of the display panel. The grating comprises light blocking zones and light transmission zones provided alternately in a row, and the light blocking zones and light transmission zones are pro-
(Continued)

vided alternately in the order of light blocking zone and light transmission zone in one of two adjacent rows and in the order of light transmission zone and light blocking zone in the other of the two adjacent rows, wherein each of at least one light blocking zone blocks completely a pixel unit. The display panel of the disclosure can solve the problem of the moire phenomenon which is caused by the overlap of directions of the light blocking zones of the grating and the black matrix of the existing display panel. In addition, the display effect of the display panel of the disclosure is better.

6 Claims, 3 Drawing Sheets

(58) Field of Classification Search
CPC  G02B 2027/0132; G02B 21/22; G02B 27/22; G02B 27/225; G02B 2027/0134; G02B 2027/0178; G02B 27/017; G02B 27/2242; G02B 2027/014; G02B 27/0093; G02B 27/0101; G02B 27/2221; G02B 2027/0187; G02B 21/0012; G02B 27/0081; G02B 27/2235; G02B 27/2292; G02B 1/06; G02B 2027/0123; G02B 2027/0127; G02B 2027/0138; G02B 21/18; G02B 21/361; G02B 23/2415; G02B 26/0816; G02B 27/01; G02B 27/0176; G02B 27/144; G02B 27/2207; G02B 27/4205; G02B 3/12; G02B 5/045; G02B 6/00; G02B 6/005; G02B 6/0061; G02B 6/0068; G02B 6/0076; G02B 13/06; G02B 17/002; G02B 17/0836; G02B 17/0848; G02B 17/086; G02B 2027/011; G02B 2027/0112; G02B 2027/0114; G02B 2027/0116; G02B 2027/0118; G02B 2027/0136; G02B 2027/0141; G02B 2027/015; G02B 2027/0159; G02B 2027/0174; G02B 2027/0181; G02B 2027/0183; G02B 2027/0194; G02B 21/20; G02B 21/36; G02B 21/368; G02B 23/00; G02B 23/18; G02B 23/2446; G02B 26/001; G02B 26/026; G02B 26/10; G02B 27/0025; G02B 27/0149; G02B 27/0179; G02B 27/02; G02B 27/026; G02B 27/0927; G02B 27/0961; G02B 27/1073; G02B 27/143; G02B 27/2257; G02B 27/2278; G02B 27/2285; G02B 27/4277; G02B 27/44; G02B 3/0043; G02B 3/0056; G02B 3/0075; G02B 3/06; G02B 5/09; G02B 5/10; G02B 5/18; G02B 5/1814; G02B 5/30; G02B 5/32; G02B 6/0013; G02B 6/0023; G02B 6/0026; G02B 6/0036; G02B 6/0038; G02B 6/0048; G02B 6/0055; G02B 6/06; G02B 6/124; G02B 6/262; G02B 6/32; G02B 7/002; G02B 7/06; G02B 7/287; H04N 13/324; H04N 13/31; H04N 13/341; H04N 13/398; H04N 13/305; H04N 13/337; H04N 13/302; H04N 13/344; H04N 13/239; H04N 13/32; H04N 13/351; H04N 2213/008; H04N 13/332; H04N 13/363; H04N 13/376; H04N 13/383; H04N 13/315; H04N 13/346; H04N 13/349; H04N 13/365; H04N 13/194; H04N 13/207; H04N 13/218; H04N 13/243; H04N 13/246; H04N 13/286; H04N 13/296; H04N 13/327; H04N 13/10; H04N 13/128; H04N 13/161; H04N 13/229; H04N 13/236; H04N 13/317; H04N 13/354; H04N 13/356; H04N 13/359; H04N 13/366; H04N 13/368; H04N 13/371; H04N 13/373; H04N 13/378; H04N 13/38; H04N 2013/0081; H04N 2013/0096; H04N 13/00; H04N 13/122; H04N 13/139; H04N 13/144; H04N 13/189; H04N 13/20; H04N 13/221; H04N 13/232; H04N 13/257; H04N 13/261; H04N 13/282; H04N 13/289; H04N 13/30; H04N 13/307; H04N 13/334; H04N 13/339; H04N 13/395; H04N 19/597; H04N 1/00204; H04N 1/00246; H04N 1/00251; H04N 1/00891; H04N 1/00896; H04N 2013/0077; H04N 2013/0088; H04N 2013/403; H04N 2013/405; H04N 2201/0094; H04N 2213/001; H04N 2213/002; H04N 5/2252; H04N 5/23216; H04N 5/23238; H04N 5/64; H04N 9/3108; H04N 9/3182; H04N 9/3197
USPC ........................................................ 359/466
See application file for complete search history.

(56) References Cited

U.S. PATENT DOCUMENTS

| 2012/0069272 | A1 | 3/2012 | Sugita et al. |
| 2012/0091372 | A1* | 4/2012 | Molnar ............. G02B 27/4205 250/550 |
| 2012/0262362 | A1 | 10/2012 | Uehara et al. |

FOREIGN PATENT DOCUMENTS

| CN | 101846761 | 9/2010 |
| CN | 102929049 | 2/2013 |
| CN | 202720395 | 2/2013 |
| CN | 202929230 | 5/2013 |
| CN | 104597611 | 5/2015 |
| CN | 104849870 | 8/2015 |
| JP | 09281440 | 10/1997 |

OTHER PUBLICATIONS

Office Action from corresponding Chinese Application No. 201510323942.8, dated Sep. 9, 2016 (8 pages).

* cited by examiner

DISPLAY PANEL AND DISPLAY DEVICE

CLAIM OF PRIORITY

This application claims priority to China patent application number 201510323942.8, which was filed on Jun. 12, 2015, the disclosure of which is incorporated by reference herein in its entirety.

TECHNICAL FIELD

The embodiments of the disclosure relate to display panel and display device.

BACKGROUND OF THE INVENTION

Currently, glasses-free 3D display technology may be realized by adopting a way of slit grating provided at a light-exiting surface side of a 2D display panel. The slit grating can realize the 3D display by its strip shaped light blocking zones and light transmission zones which are spaced apart from each other, such that the left eye and the right eye can receive different parallax images respectively.

The inventors finds that there are following problems in the prior art: the direction of the light blocking zones and light transmission zones of the slit grating is usually parallel to the direction of the black matrix in the display panel, therefore it may result in a moire phenomenon of the display panel when displaying.

SUMMARY OF THE INVENTION

One of technical problems to be solved by embodiments of the disclosure are directed to the above mentioned problems in the 3D display panel of the prior art. There is provided a display panel and a display device which can effectively avoid the moire phenomenon and improve the display quality.

According to a first aspect of the disclosure, there is provided a display panel. The display panel comprises matrix-arranged pixel units and a grating provided at a light-exiting surface side of the display panel, wherein the grating comprises light blocking zones and light transmission zones provided alternately in a row, and the light blocking zones and light transmission zones are provided alternately in the order of light blocking zone and light transmission zone in one of two adjacent rows and in the order of light transmission zone and light blocking zone in the other of the two adjacent rows, wherein each of at least one light blocking zone blocks completely a pixel unit.

According to an embodiment, the area of each light blocking zone is equal to the area of each pixel unit.

According to an embodiment, the area of each light blocking zone is equal to the area of each light transmission zone.

According to an embodiment, each light blocking zone blocks completely one pixel unit.

According to an embodiment, the area of each light blocking zone is greater than the area of each light transmission zone.

According to an embodiment, the area of each light blocking zone is two times of the area of each light transmission zone.

According to an embodiment, one of two adjacent light blocking zones in a row blocks completely one pixel unit, the other one blocks a part of each of the two adjacent pixel units.

According to a second aspect of the disclosure, there is provided a display device comprising the display panel described above.

The embodiments of the disclosure have the following advantageous effects: since the grating of the display panel according to the disclosure comprises light blocking zones and light transmission zones provided alternately in a row, and the light blocking zones and light transmission zones are provided alternately in the order of light blocking zone and light transmission zone in one of two adjacent rows and in the order of light transmission zone and light blocking zone in the other of the two adjacent rows, therefore the light blocking zones of the grating in a column are not provided continuously. It can be understand by those skilled in the art that the black matrix in the display panel is provided continuously in a column, and directions of the light blocking zones of the grating and the black matrix of the display panel of the disclosure are not identical, therefore the moire phenomenon can be avoided effectively and the display quality of the display panel can be improved. Since the display device comprises the above display panel, its display effect is better.

BRIEF DESCRIPTION OF THE DRAWINGS

In order to illustrate the technique solution of embodiments of the disclosure more clearly, the accompanying drawings will hereinafter be introduced briefly. It is obvious that the accompanying drawings in the following description are only related to some embodiments of the present disclosure and should not be construed as limited to the disclosure.

DETAILED DESCRIPTION OF SPECIFIC EMBODIMENTS

To make the objects, technical solutions and advantages of embodiments of the disclosure more clear, the technical solutions of embodiments of the disclosure will be described below clearly and completely in connection with the accompanying drawings of embodiments of the disclosure. It is obvious that the described embodiments are only some, but not all the embodiments of the disclosure. Based on the embodiments of the disclosure, all the other embodiments made by those of ordinary skill in the art without the premise of creative work belong to the scope of protection of the disclosure.

There is provided a display panel according to embodiments of the disclosure. The display panel comprises matrix-arranged pixel units and a grating provided at a light-exiting surface side of the display panel. The grating comprises light blocking zones and light transmission zones provided alternately in a row, and the light blocking zones and light transmission zones are provided alternately in the order of light blocking zone and light transmission zone in one of two adjacent rows and in the order of light transmission zone and light blocking zone in the other of the two adjacent rows, wherein each of at least one light blocking zone blocks completely a pixel unit.

It is noted that a light blocking zone blocking completely a pixel unit refers to that the orthographic projection of the pixel unit on the plane of the display panel is located within or overlaps with the orthographic projection of the light blocking zone on the plane of the display panel, in other words, the light cannot penetrate on the direction perpendicular to the plane of the display panel in the completely blocked pixel unit. The "blocking" as used herein refers to that respective orthographic projections of the pixel unit and the light blocking zone of the grating at least partially overlap on the plane of the display panel, and the light from the display panel cannot penetrate on the direction perpendicular to the plane of the display panel in the blocked area of the pixel unit. The display panel of the disclosure will be illustrated specifically by two embodiments in the following.

Embodiment 1

Figure 1:
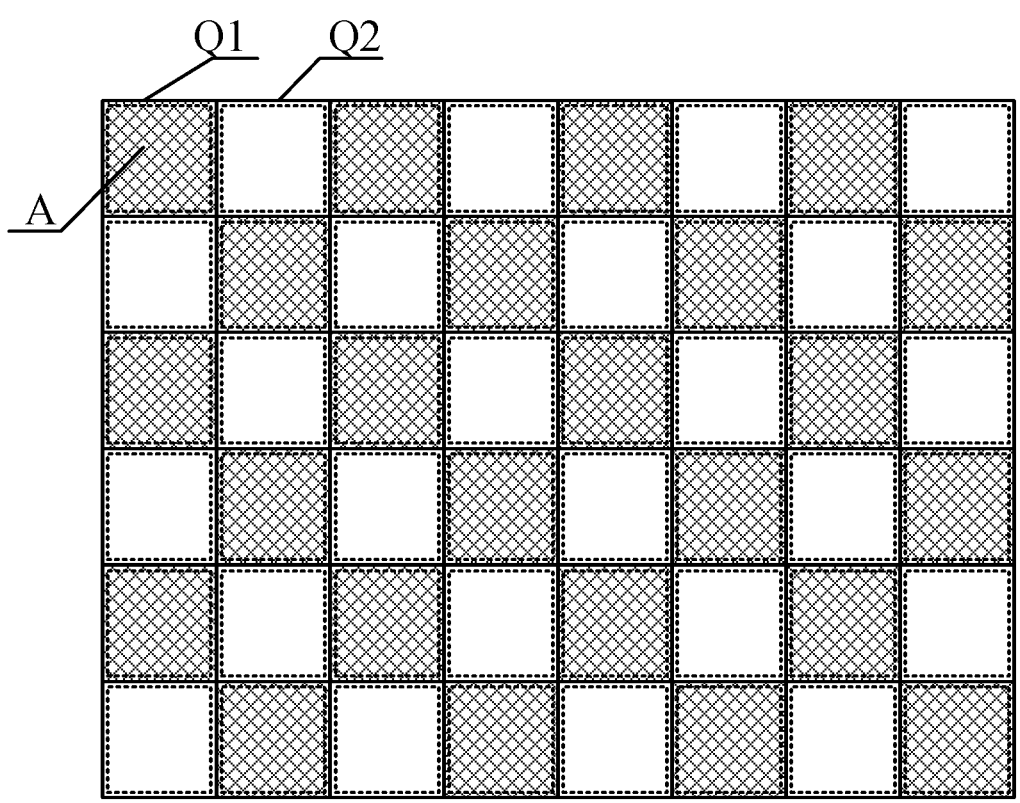
FIG. 1 schematically depicts a display panel according to an embodiment of the disclosure.

As shown in FIG. 1, there is provided a display panel according to an embodiment. The display panel comprises matrix-arranged pixel units A and a grating provided at a light-exiting surface side of the display panel. The grating comprises light blocking zones Q1 and light transmission zones Q2 provided alternately in a row, and the light blocking zones Q1 and light transmission zones Q2 are provided alternately in the order of light blocking zone Q1 and light transmission zone Q2 in one of two adjacent rows and in the order of light transmission zone Q2 and light blocking zone Q1 in the other of the two adjacent rows. In this embodiment, the area of the light blocking zone Q1 is equal to the area of the light transmission zone Q2 and is equal to the area of one pixel unit A, and each light blocking zone Q1 blocks a pixel unit A. The area delineated by dashed box in FIG. 1 is a pixel unit A. The pixel unit A may be a pixel, for example, a pixel may comprise three different color (red, green and blue) sub-pixels, or may be a sub-pixel.

It may be understood that the light blocking zones Q1 and light transmission zones Q2 of the grating of the display panel of the embodiment are provided alternately both in a row and in a column. In other words, the light blocking zones Q1 of the grating of the embodiment are not provided continuously in a column. It can be understood that the black matrix on the display panel is provided continuously in a column, while the directions of the light blocking zones Q1 of the grating and the black matrix are not identical, thereby the moire phenomenon can be avoided effectively and the display quality of the display panel can be improved.

As an alternative, the light blocking zone Q1 of the grating blocks completely a pixel unit A, in other words the location of the light blocking zone Q1 is corresponding to the location of the pixel unit A. Since the area of each light blocking zone Q1 is equal to the area of each light transmission zone Q2 and is equal to the area of a pixel unit A in this embodiment, the location of a light transmission zone Q2 of the grating is corresponding to the location of a pixel unit A.

Figure 2:
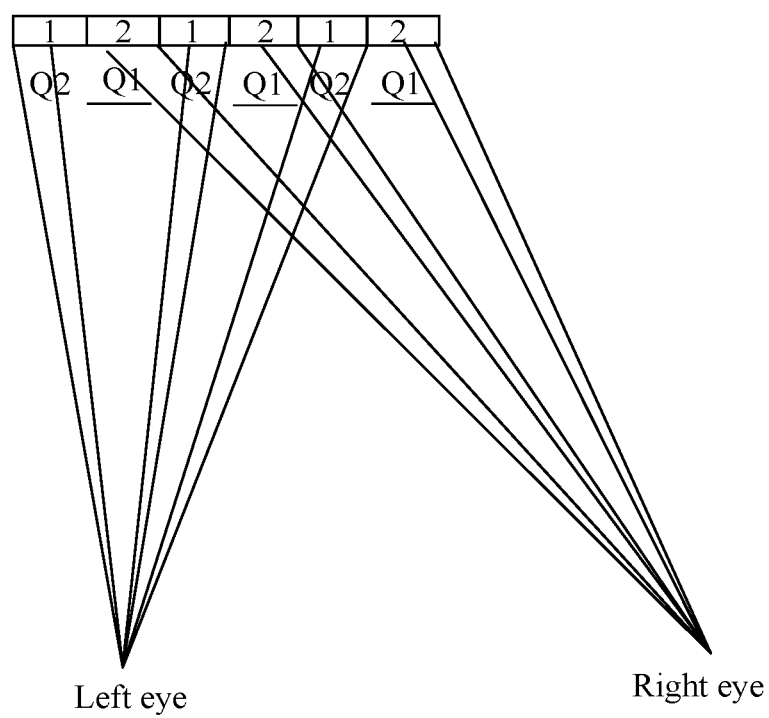
FIG. 2 depicts a schematic diagram of watcher perspective of the display panel in FIG. 1.

FIG. 2 depicts a schematic diagram of watcher perspective of the display panel in FIG. 1. As shown in FIG. 2, the pixel unit A is marked as 1 and 2, the light transmission zone Q2 is corresponding to the pixel unit marked as 1, and the light blocking zone Q1 is corresponding to the pixel unit marked as 2. As used herein, "corresponding" refers to respective orthographic projections of the light transmission zone Q2 and the pixel unit marked as 1 overlap completely with each other on the plane of the display panel, and respective orthographic projections of the light blocking zone Q1 and the pixel unit marked as 2 overlap completely with each other on the plane of the display panel. In this case, the left eye can see the pixel unit marked as 1 on the display panel, and the right eye can see the pixel unit marked as 2 on the display panel. The left-eye image and the right-eye image can be combined into a 3D image.

It can be understood that the light blocking zones Q1 and light transmission zones Q2 of the grating in the display panel of this embodiment are provided alternately both in a row and in a column and each light blocking zone Q1 only blocks completely a pixel unit A, and the area of each light blocking zone is equal to that of a pixel unit A. Comparing to the display panel without rotation, the light blocking zones Q1 and light transmission zones Q2 are still provided alternately both in a row and in a column after the display panel is rotated by 90 degree, and each light blocking zone Q1 still only blocks completely a pixel unit A, therefore it does not affect the normal display of the display panel, i.e., the display image is same as the display image before rotating, thereby capable of realizing the display switch of landscape and portrait of the display panel.

Embodiment 2

Figure 3:
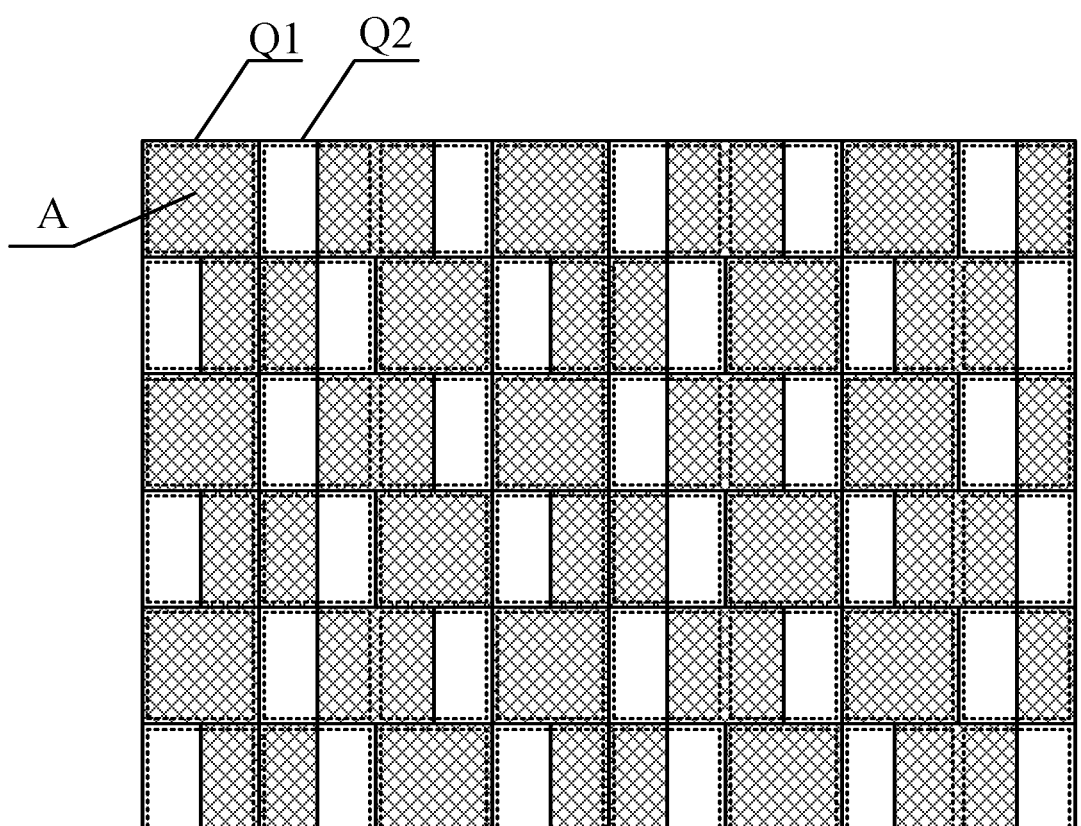
FIG. 3 schematically depicts a display panel according to another embodiment of the disclosure.

As shown in FIG. 3, there is provided a display panel according to an embodiment. The display panel comprises matrix-arranged pixel units A and a grating provided at a light-exiting surface side of the display panel. The grating comprises light blocking zones Q1 and light transmission zones Q2 provided alternately in a row, and the light blocking zones Q1 and light transmission zones Q2 are provided alternately in the order of light blocking zone Q1 and light transmission zone Q2 in one of two adjacent rows and in the order of light transmission zone Q2 and light blocking zone Q1 in the other of the two adjacent rows. In this embodiment, the area of each light blocking zone Q1 is greater than the area of each light transmission zone Q2, and the area of each light blocking zone Q1 is equal to the area of a pixel unit A.

We assume that the first row of the grating starts from a light blocking zone Q1 and a light transmission zone Q2 and then they are provided alternatively. The second row of the grating starts from a light transmission zone Q2 and a light blocking zone Q1 and then they are provided alternatively. Subsequently, the arrangement way of odd rows is same as the first row, and the arrangement way of even rows is same as the second row. In this embodiment, since the area of each light blocking zone Q1 is greater than the area of each light transmission zone Q2, the location of each light blocking zone Q1 in the first row is corresponding to the location of a light transmission zone Q2 and a part of location of a light blocking zone Q1 in the second row. It may be understood that the black matrix on the display panel is provided continuously in a column, therefore it is easy to understood that the directions of the light blocking zones Q1 of the grating and the black matrix are not identical, thereby the production of moire phenomenon can be avoided effectively and the display quality of the display panel can be improved. Moreover the area of each light blocking zone Q1 is greater than the area of each light transmission zone Q2, therefore it can effectively avoid the interference phenomenon of the left-eye image and the right-eye image.

As an alternative, the area of a light blocking zone Q1 of the grating is two times of the area of a light transmission zone Q2.

Specifically as shown in FIG. 3, one of two adjacent light blocking zones Q1 in a row blocks completely a pixel unit A, the other one blocks a part of each of two adjacent pixel units A. In this case, if the first light transmission zone Q2 in first row is corresponding to a right-eye image, then the second light transmission zone Q2 in first row is corresponding to a left-eye image. Similarly, one of two adjacent light blocking zones Q1 in a column blocks completely a pixel unit A, and the other one blocks a part of each of two adjacent pixel units A. In this embodiment, comparing with the prior art, it is easy to discover that the distance between a left-eye image and a right-eye image is larger in a row and in a column, i.e., the width of the light blocking zones Q1 is greater than that of the light transmission zone Q2, therefore it can effectively avoid the interference phenomenon of the left-eye image and the right-eye image within a watching range.

The embodiments of the disclosure further provide a display device comprising the display panel of embodiments 1 or 2. The display device can realize 3D display and achieve better display effect.

The display device may comprise any products or parts with the displaying ability, such as a cell phone, a tablet computer, a television, a display, a notebook computer, a digital photo frame, a navigator, etc.

It can be understood that the display device of the embodiment may further comprises other conventional structures such as power subsystem, displaying driver unit, etc.

The above is only exemplary implementations of the disclosure, without limiting protection scope of the disclosure which is defined by the claims.

What is claimed is:

1. A display panel comprising:
   matrix-arranged pixel units; and
   a grating positioned at a light-exiting surface side of the display panel, wherein the grating comprises light blocking zones and light transmission zones positioned alternately in the order of light blocking zone and light transmission zone in one of two adjacent rows and in the order of light transmission zone and light blocking zone in the other of the two adjacent rows, wherein:
   at least one of the light blocking zones completely blocks at least one of the pixel units, and an area of each light blocking zone is equal to an area of each pixel unit; and
   one of two adjacent light blocking zones in a row completely blocks a pixel unit, and the other one of the two adjacent light blocking zones blocks a part of each of two adjacent pixel units.

2. A display device comprising a display including the display panel of claim 1.

3. The display panel according to claim 1, wherein the area of each light blocking zone is greater than the area of each light transmission zone.

4. A display device comprising a display including the display panel of claim 3.

5. The display panel according to claim 3, wherein the area of each light blocking zone is two times the area of each light transmission zone.

6. A display device comprising a display including the display panel of claim 5.

* * * * *